United States Patent
Sasaki

(10) Patent No.: US 8,220,043 B2
(45) Date of Patent: Jul. 10, 2012

(54) INFORMATION PROCESSING DEVICE AND COMPUTER IMPLEMENTED METHOD FOR INFORMATION PROCESSING DEVICE

(75) Inventor: Hiroyuki Sasaki, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 922 days.

(21) Appl. No.: 12/241,781

(22) Filed: Sep. 30, 2008

(65) Prior Publication Data
US 2009/0089868 A1  Apr. 2, 2009

(30) Foreign Application Priority Data
Oct. 1, 2007  (JP) ................................. 2007-258098

(51) Int. Cl.
*G06F 9/00* (2006.01)
*G06F 15/16* (2006.01)
*G06F 17/00* (2006.01)

(52) U.S. Cl. ............. 726/14; 726/12; 709/227; 709/228

(58) Field of Classification Search .......... 709/227–228; 726/12, 14
See application file for complete search history.

(56) References Cited

U.S. PATENT DOCUMENTS

| | | | | |
|---|---|---|---|---|
| 7,558,862 | B1* | 7/2009 | Tyukasz et al. ................ | 709/227 |
| 7,948,890 | B2* | 5/2011 | Shieh et al. .................... | 370/235 |
| 2003/0112823 | A1* | 6/2003 | Collins et al. .................. | 370/474 |
| 2004/0044777 | A1 | 3/2004 | Alkhatib et al. | |
| 2004/0139227 | A1* | 7/2004 | Takeda .......................... | 709/245 |
| 2004/0139228 | A1* | 7/2004 | Takeda et al. ................. | 709/245 |
| 2005/0105543 | A1* | 5/2005 | Ikenaga et al. ................ | 370/428 |
| 2005/0286519 | A1* | 12/2005 | Ravikumar et al. ........... | 370/389 |
| 2006/0050700 | A1* | 3/2006 | Ravikumar et al. ........... | 370/389 |
| 2006/0133354 | A1 | 6/2006 | Lee | |
| 2006/0182100 | A1* | 8/2006 | Li et al. ......................... | 370/389 |
| 2006/0209794 | A1* | 9/2006 | Bae et al. ....................... | 370/352 |

(Continued)

FOREIGN PATENT DOCUMENTS

JP  2006-086954  3/2006

(Continued)

OTHER PUBLICATIONS

J. Rosenberg et al. RFC 4389: STUN—Simple Traversal of User Datagram Protocol (UDP) through Network Address Translators (NATs). IETF. p. 1-48.*

(Continued)

*Primary Examiner* — Christian Laforgia
(74) *Attorney, Agent, or Firm* — Banner & Witcoff, Ltd.

(57) ABSTRACT

An information processing device that causes a router to open a new communication port and permits an active access from a terminal when the terminal connected to an outer network is provided. A multi function device (information processing device) accesses a POP server and acquires a mail. In a case where the mail from an outer terminal describes an access request, the multi function device transmits to a port-open-command that requests a router to open a new communication port. The multi function device transmits to the outer terminal a port identifier of the new communication port that was opened by the router. The outer terminal transmits data to the multi function device with the received port identifier designated therein. The multi function device, triggered by the mail from the outer terminal, can cause the router to open a new communication port that permits an active access from the outer terminal.

13 Claims, 6 Drawing Sheets

U.S. PATENT DOCUMENTS

| | | | |
|---|---|---|---|
| 2006/0209822 A1* | 9/2006 | Hamamoto et al. | 370/389 |
| 2006/0215684 A1* | 9/2006 | Capone | 370/437 |
| 2007/0019545 A1* | 1/2007 | Alt et al. | 370/230 |
| 2007/0019622 A1* | 1/2007 | Alt et al. | 370/352 |
| 2007/0019623 A1* | 1/2007 | Alt et al. | 370/352 |
| 2007/0022289 A1* | 1/2007 | Alt et al. | 713/168 |
| 2007/0036143 A1* | 2/2007 | Alt et al. | 370/352 |
| 2007/0043829 A1* | 2/2007 | Dua | 709/219 |
| 2007/0076729 A1* | 4/2007 | Takeda | 370/401 |
| 2007/0189311 A1* | 8/2007 | Kim et al. | 370/401 |
| 2007/0217407 A1* | 9/2007 | Yuan et al. | 370/389 |
| 2007/0271329 A1 | 11/2007 | Hirao et al. | |
| 2008/0165802 A1 | 7/2008 | Tang | |
| 2008/0225839 A1* | 9/2008 | Gobara et al. | 370/389 |
| 2009/0313386 A1* | 12/2009 | Hamamoto et al. | 709/245 |
| 2010/0005180 A1* | 1/2010 | Tyukasz et al. | 709/228 |
| 2010/0153560 A1* | 6/2010 | Capone et al. | 709/227 |
| 2010/0189099 A1* | 7/2010 | Bae et al. | 370/352 |
| 2010/0257276 A1* | 10/2010 | Savolainen | 709/230 |
| 2011/0149956 A1* | 6/2011 | Alt et al. | 370/352 |

FOREIGN PATENT DOCUMENTS

WO    WO 2006/089481 A1    8/2006

OTHER PUBLICATIONS

Hideo Yoshimi et al., "NAT Traversal Technology of Reducing Load on Relaying Server for P2P connections," Consumer Communications and Networking Conference, Jan. 1, 2007, pp. 100-104.

European Search Report issued in Patent Application No. 08253174.0-2413 dated on Jan. 5, 2009.

EP Office Action mailed Feb. 3, 2012, EP Appln. 08253174.0-2413.

\* cited by examiner

FIG. 2

| MAIL ADDRESS | IP ADDRESS | PORT NUMBER | DATA SIZE [byte] | OPEN TIME [msec] |
|---|---|---|---|---|
| pc0@bbb.co | ttt.xxx.yyy.zzz | 50515 | 4,372,561 | 625,000 |
| ⋮ | ⋮ | ⋮ | ⋮ | ⋮ |

90a
To : mfc1@aaa.com
From : pc0@bbb.com
Subject : Port Open Request

90b
Request = Print
Port Number = 515
Data Size = 4,372,561 [byte]
IP Address = ttt.xxx.yyy.zzz

92a
To : pc0@bbb.com
From : mfc1@aaa.com
Subject :Re : Port Open Request

92b
Result = Request Accepted
Port Number = 50515
IP Address = aaa.bbb.ccc.ddd

INFORMATION PROCESSING DEVICE AND COMPUTER IMPLEMENTED METHOD FOR INFORMATION PROCESSING DEVICE

CROSS-REFERENCE TO RELATED APPLICATION

This application claims priority to Japanese Patent Application No. 2007-258098, filed on Oct. 1, 2007, the contents of which are hereby incorporated into this specification by reference.

BACKGROUND OF THE INVENTION

1. Field of the Invention

The present invention relates to an information processing device connected to a local area network that is connected to an outer network through a router. More specifically, the present invention relates to an information processing device capable of causing a router to open a new communication port in a case where a terminal connected to an outer network needs an access and also capable of accepting an access from an outer terminal. The term "communication port" in the present specification refers to a logical communication channel that is opened by a device (typically, a device referred to as a "router") connecting two networks.

2. Description of the Related Art

An information processing device connected to a local area network (hereinafter called "LAN") needs to be protected against any unauthorized access by a terminal (hereinafter called "outer terminal") connected to an outer network. An information processing device connected to a LAN may hereinafter be called an "inner terminal" in order to distinguish it from the outer terminal. In order to prevent any unauthorized access to the inner terminal, a router connecting the LAN and the outer network restricts an active access by the outer terminal to the inner terminal. In the present specification, "an active access by the outer terminal to the inner terminal" refers to an access where a communication is initiated by the outer terminal. Specifically, the router restricts an active access by the outer terminal by restricting a communication port (hereinafter often simply called "port") that opens to an outer network to which the outer terminal connects.

In a case where the inner terminal connected to the LAN communicates with the outer terminal, an access from the outer terminal to the inner terminal is usually permitted after the inner terminal initiates the communication. The term "initiate" is synonymous to "actively access" in the present specification. The router permits an access from the outer terminal to the inner terminal in a case where the access by the outer terminal is a response for the access by the inner terminal to the outer terminal. More specifically, when the router receives an access from the inner terminal to the outer terminal, the router opens a new port for receiving a response from the outer terminal in regards to the aforesaid access by the inner terminal, and transfers the access by the inner terminal to the outer terminal. When transferring the access by the inner terminal to the outer terminal, the router informs the outer terminal a port identifier of the opened new port. The outer terminal then in response transmits data for accessing the inner terminal with the port identifier designated. When the router receives the access by the outer terminal with the designated port identifier, the router transfers the access to the inner terminal. In TCP/IP, this function of the router is realized by a port translation process referred to as an NAPT (Network Address Port Translation) or an IP masquerade, for example. For example, a typical port translation process is executed by a router in a case where an inner terminal accesses a POP server (POP server is a kind of the outer terminal) and acquires an electronic mail (hereinafter abbreviated as "mail") addressed to it from the POP server.

BRIEF SUMMARY OF THE INVENTION

For example, a user may want to retrieve data stored in an information processing device (an inner terminal) connected to a corporate LAN through an external network. Or, on the contrary, a user may want to transmit data to the inner terminal through the external network. In case of retrieving (or transmitting) a large quantity of data, it is desirable to allow active access by the outer terminal to the inner terminal without using a mail protocol. A technique to allow active access by the outer terminal to the inner terminal without using a mail protocol is disclosed in, for example, Japanese Patent Application Publication No. 2006-86954 (Patent Document 1). According to the technique disclosed by the Patent Document 1, a device (an inner terminal) transmits a port identifier of a new port created by a router to the outer terminal after the inner terminal causes the router to open the new port. The outer terminal can access actively to the device (the inner terminal) by designating the received port identifier.

However, the technique disclosed by the Patent Document 1, the inner terminal firstly has to execute a process of causing the router to open a new port. Therefore, it is necessary for a user to operate the inner terminal. As explained above, an active access by the outer terminal to the inner terminal cannot be realized until the router opens a new port; it is undesirable in security to always open a port through which the outer terminal can actively access to the inner terminal in the router. There is a need for techniques that cause the router to open a new port, without the user's operation of the inner terminal, for allowing active access by the outer terminal to the inner terminal whenever the outer terminal requires.

The teachings disclosed by the present specification have been developed by focusing to the fact that the router always allows the information processing device (inner terminal) to actively access to a specific outer terminal. The information processing device, for example by using a mail protocol, accesses to a POP server at regular intervals to acquire mails addressed to itself. The present teachings provide an information processing device that detects the presence of an outer terminal requiring an active access by utilizing this access route (mail protocol). The present information processing device detects the presence of an outer terminal requiring an active access, thereby causing a router to open a new port and notify the outer terminal of a port identifier of the new port. The outer terminal that received the port identifier of the new port can actively access to the information processing device.

Specifically, in a case where an active access to the inner terminal is required, the outer terminal transmits a mail that requests an access to the inner terminal. The mail is transmitted to a POP server. The inner terminal accesses to the POP server at regular intervals, and acquires the mail addressed to oneself. In a case where the acquired mail contains an access request from the outer terminal, the inner terminal transmits a port-open-command to the router. At the same time, the inner terminal transmits a port identifier of the opened new port to the outer terminal. Once the outer terminal receives the port identifier, the outer terminal can transmit an access with designation of the received port identifier. Since the router opens the new port specified by the aforementioned port identifier, the router transfers the access by the outer terminal to the inner terminal. That is, an active access by the outer terminal to the inner terminal is established. It should be noted that "a port identifier of a new port" means an identifier for identifying a new port. In addition, it should also be noted that "a port identifier of a new port" may be restated as "a port identifier assigned to a new port". Furthermore, it should also be noted that "transmit a port identifier" may be restated as "forward a port identifier" or "port forwarding".

The present teachings can be embodied in an information processing device connected to a local area network that is connected to an outer network through a router. The term "an information processing device" here is synonymous with the aforementioned "inner terminal". The information processing device comprises an access control module, a port control module and a port data transmitting module.

The access control module accesses through a router to a first terminal (for example, a POP server) connected to an outer network at regular intervals and acquires first data (for example, mail data) stored in the first terminal. The port control module transmits to the router a port-open-command that requests the router to open a new port in a case where the acquired first data contains a second terminal identifier for identifying a second terminal (an outer terminal) connected to the outer network and an access request by the second terminal. When the router receives the port-open-command, the router opens a new port. The port data transmitting module transmits a port identifier of the new port (a port identifier assigned to the new communication port opened), to the second terminal specified by the second terminal identifier. In addition, this information processing device may transmit a port-open-command that designates an arbitrary port identifier. Alternatively, in a case where a port identifier is not designated in the port-open-command, the router opens a new port with unique port identifier assigned thereto, and the information processing device receives the assigned port identifier from the router. In either case, the information processing device can acquire the port identifier of the new communication port. Moreover, the port data transmitting module may transmit the port identifier to the second terminal based on a mail protocol.

According to the present information processing device, the second terminal (outer terminal) connected to the outer network transmits to the first terminal the first data describing a message (an access request) that requests an active access by the second terminal to the information processing device (inner terminal). The information processing device automatically transmits a port-open-command to the router in response to the message in the mail. A user can cause the router to open a new port without directly operating the information processing device. That is, the present information processing device can cause the router, without any direct operation by the user, to immediately open a new port to allow an active access by the outer terminal when the outer terminal requires an active access. Each of the modules may be realized by hardware resources, as well as by a software resource (computer program).

The present teachings provide an information processing device connected to a LAN and capable of causing a router to open a new communication port to allow an outer terminal connected to an outer network to make an active access to the information processing device when the outer terminal requires such access.

BRIEF DESCRIPTION OF THE DRAWINGS

FIG. 2 shows an example of an address list stored by the multi function device.

FIG. 3 shows an example of contents of a mail acquired from an outer terminal.

FIG. 4 shows an example of contents of a mail transmitted to the outer terminal.

DETAILED DESCRIPTION OF THE PREFERRED EMBODIMENT

An embodiment of an information processing device taught in the present teachings will be explained with reference to the drawings. In the present embodiment, a multi function device connected to a LAN (Local Area Network) will be explained as an example of the information processing device. It should be noted that the networks explained in the present embodiment is based on a TCP/IP protocol. That is, the multi function device, a POP server (described later) and a router (described later) of the present embodiment can execute communication processes based on TCP/IP standard. Further, a router connecting a LAN and a WAN (Wide Area Network) can execute a process of accepting a command from a device or a terminal connected to the LAN to open a communication port or to close the opened port.

Figure 1:
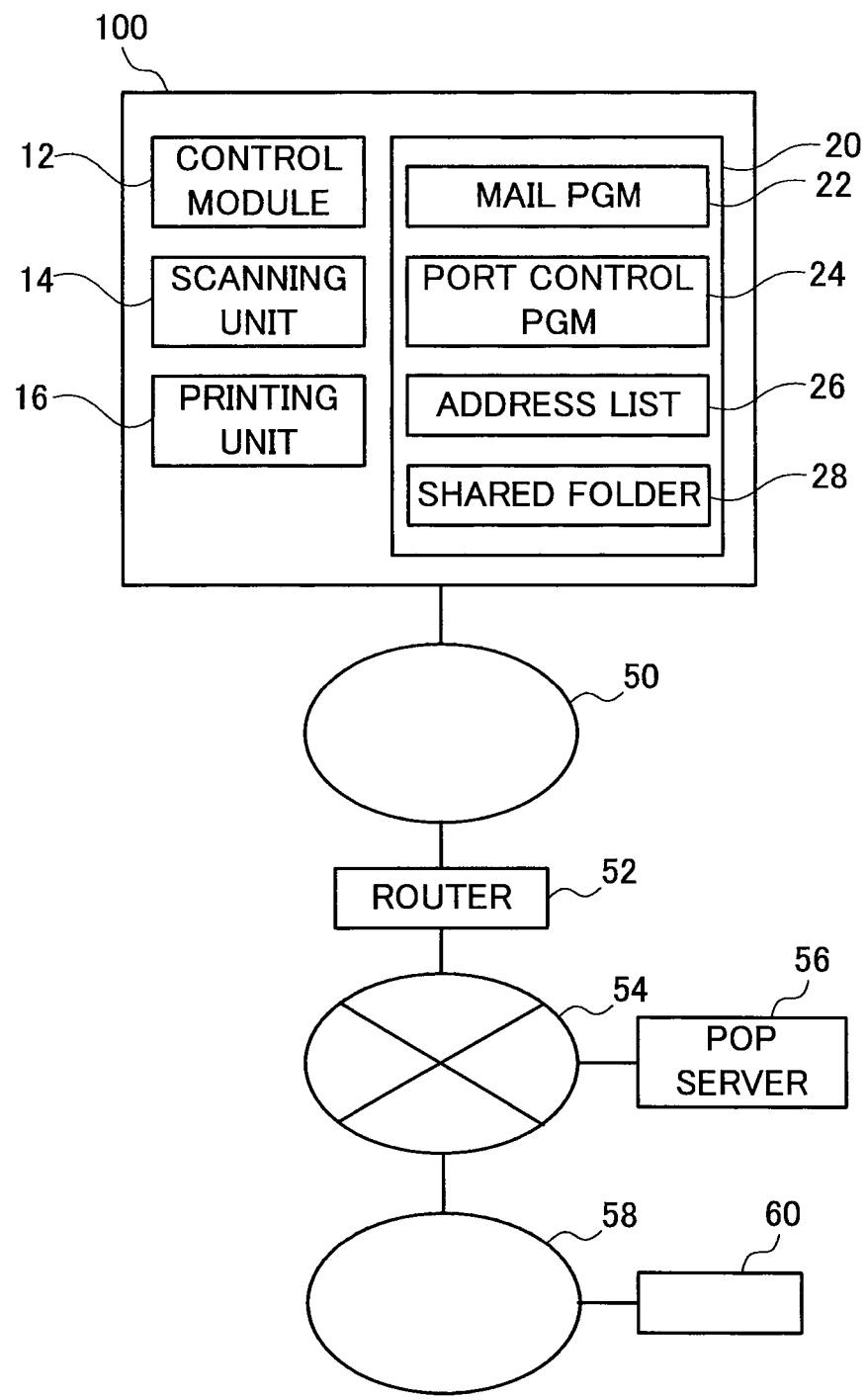
FIG. 1 shows a schematic block diagram of a multi function device (an information processing device) and entire of the networks.

FIG. 1 shows a block diagram of a multi function device 100 (a kind of an information processing device) of the present embodiment and a schematic view of a LAN to which the multi function device 100 is connected and of an outer network. The multi function device 100 is connected to a LAN 50. The LAN 50 and a WAN 54 are connected so as to be able to communicate with each other through a router 52. A POP server 56 (a first terminal) is connected to the WAN 54. To the WAN 54, another LAN 58 is connected, and an outer terminal 60 (a second terminal) is connected to the other LAN 58. It should be noted that a router connecting the WAN 54 and the LAN 58 is not shown in the drawings. The WAN 54 and the LAN 58 represent networks outside the multi function device 100. In that sense, the WAN 54 and the LAN 58 are parts of an "outer network".

A configuration of the multi function device 100 will be explained. The multi function device 100 comprises a control module 12, a reading unit 14, a printing unit 16 and a memory 20. The control module 12 includes a CPU and controls the reading unit 14 and the printing unit 16. Further, the control module 12 controls a communication with other terminals (a terminal connected to the LAN 50, or an outer terminal connected to the outer network). The control module 12 corresponds to a "port data transmitting module". The control module 12 executes processes described in the programs stored in the memory 20.

The scanning unit 14 is hardware for scanning the information (such as text, photographs) printed on a sheet as image data. The scanned image data are stored in the memory 20. The printing unit 16 is hardware for printing the data stored in the memory 20. The printing unit 16 prints the data scanned by the scanning unit 14, thereby a copy function is realized. A shared folder 28 is allocated in the memory 20, and the image data scanned by the scanning unit 14 is stored in the shared folder 28 as a file. Further, the printing unit 16 prints the data stored in the shared folder 28.

The programs stored in the memory 20 will be explained. It should be noted that the letters "PGM" described in FIG. 1 refers to a program. In the memory 20, a mail program 22 and a port control program 24 are stored. The mail program 22 describes instructions to the CPU in the control module 12 for a process of transmitting and receiving a mail between another terminal in accordance with a mail protocol. In addition, in fact, the mail transmitted to the multi function device 100 by the outer terminal (for example, the outer terminal 60) is stored in the POP server 56 (the first terminal). The multi function device 100 accesses to the POP server 56 at regular intervals and retrieves the mail addressed to itself. Further, the mail transmitted by the multi function device 100 is transmitted to an SMTP server (not shown). The SMTP server transfers the mail to the POP server corresponding to the mail destination terminal. With this configuration, the multi function device 100 can send and receive mails between the outer terminals. The mail protocol for exchanging the mail is a well-known technique, so the details thereof are omitted. The mail protocol adopted by the multi function device 100 is based on the TCP/IP standard, and the multi function device 100 can actively access to the POP server 56 through the router 52. The control module 12 executing the mail program 22 corresponds to the "access control module".

The port control program 24 describes instructions for a process of transmitting to the router 52 a port-open-command that requests the router 52 to open a new port (new communication port), or instructions for a process of transmitting a port-close-command that requests the router 52 to close the opened communication port. The process described in the port control program 24 will be described later in detail. It should be noted that "transmitting a port-open-command" may also be referred to as "forwarding a port-open-command" or "port forwarding". The control module 12 executing the port control program 24 corresponds to the "port control module".

In the memory 20, an address list 26 (an identifier list) is stored. In the address list 26, terminal identifiers for identifying the outer terminals that communication with the multi function device 100 allowed are described (registered). In this embodiment, the terminal identifiers for identifying the POP server 56 (a first terminal) and the outer terminal 60 (the second terminal) are registered in the address list 26. The terminal identifier of the outer terminal 60 is hereinafter referred to as the second terminal identifier. The terminal identifiers are expressed as an IP address, a terminal name aliased to the IP address, or a mail address, for example. The terminal identifiers registered in the address list 26 can be edited by a user.

A specific example of the address list 26 will be explained with reference to FIG. 2. The address list 26 is the set of records in which 5 items: the mail address, IP address, port number, data size and open time are associated with each other. In the section of mail address, the mail address "pc0@bbb.com" of the outer terminal 60 for which to permit a communication through a new port is previously registered. The items except for the mail address are set in a process of establishing an active data communication (an active access) from the outer terminal 60 (described later in detail). In the item of IP address, the IP address of the outer terminal 60 for which the multi function device 100 permits an active access is described. In the section of port number (port identifier), a port number assigned to the new port of the router 52 is described. The router 52 opens the new port in accordance with the port-open-command sent from the multi function device 100. The port-open-command is sent in response to an access request that had been transmitted from the outer terminal 60. In the item of data size, a size (in bytes) of data to be communicated between the multi function device 100 and the outer terminal 60 is described. In the item of open time, a time duration (in milliseconds) in which the multi function device 100 waits for an active access by the outer terminal 60 after opening the new port is described. In addition, in a case where no active access from the outer terminal 60 is received until the open time has elapsed, the multi function device 100 transmits to the router 52 a port-close-command that requests the router 52 to close the new port. The port number (port identifier) is registered in the address list 26, because it is necessary to specify the port number of the port to be closed later when transmitting to the router 52 a port-close-command that closes the formerly opened port.

The functions of the multi function device 100 relating to the present invention will be outlined below. The multi function device 100 accesses to the POP server 56 (the first terminal) at regular intervals and acquires a mail (if it exists) addressed to it. The acquired mail corresponds to the "first data". In a case where the acquired mail describes the access request that the outer terminal 60 (the second terminal) requests the multi function device 100 to access, the multi function device 100 transmits to the router 52 the port-open-command. The port-open-command requests the router 52 to open a new port. In addition, in the port-open-command, the multi function device 100 designates a port number (port identifier) assigned to a new port to be opened. The router 52 opens a new port to the WAN 54 side in response to receiving the port-open-command from the multi function device 100.

Then, the multi function device 100 transmits to the outer terminal 60 a mail that describes a port number of the opened new port and an IP address of the router 52 on the WAN side. It should be noted that the IP address of the router 52 is one of examples of a "router identifier" that identifies the router. It should be also noted that the mail received from the outer terminal 60 describes a mail address of the mail source terminal (a mail address of the outer terminal 60). Therefore, the multi function device 100 designates the mail address of the mail source terminal described in the received mail as a destination and transmits the mail in which the port number and the IP address are described.

After the outer terminal 60 receives a mail from the multi function device 100, the outer terminal 60 transmits data (second data) to the router 52 with the designation of the port number described in the received mail. The router 52 receives from the outer terminal 60 the second data that designates the port number of the new port. The router 52 transfers to the multi function device 100 the second data. That is, the outer terminal 60 can actively access to the multi function device 100 through the new port. In addition, the outer terminal 60 recognizes the IP address of the router 52 of the WAN side by means of the IP address described in the mail from the multi function device 100.

The processes executed by the multi function device 100 will be explained in detail below. Here, it is assumed that the user of the outer terminal 60 shown in FIG. 1 desires to transmit printing data as the second data to the multi function device 100, and desires the multi function device 100 to print the printing data.

Firstly, data to be communicated between the outer terminal 60 and the multi function device 100 will be explained. An example of the mail (first data) to be transmitted from the outer terminal 60 to the multi function device 100 is shown in FIG. 3. It should be noted that the POP server 56 receives the mail addressed to the multi function device 100, as described above. In a header 90a of a mail 90, mail address "mfc1@aaa.com" of the multi function device 100 is described as an address of a mail destination terminal, and a mail address "pc0@bbb.com" of the outer terminal 60 is described as an address of a mail source terminal. It should be noted that a subject of the mail is "Port Open Request".

In a mail body 90b of the mail 90, messages are described. The message "Request=Print" means that the outer terminal 60 requests the multi function device 100 to execute the printing process. More specifically, this message requests the multi function device 100 to receive the data to be transmitted by the outer terminal 60 and also requests the multi function device 100 to print the received data. In other words, this message represents an active access request (a transmission of printing data) from the outer terminal 60 to the multi function device 100 and also represents an execution request for printing process. To actively make access by the outer terminal 60 to the multi function device 100 as the consequence of the aforesaid active access request, the multi function device 100 has to cause the router 52 to open a new port that permits such an access. The procedure to cause the router 52 to open the new port will be described later.

In the mail body 90b, the message "Port number=515" indicates that the port number that the outer terminal 60 wants to assign to a newly opened port is "515". The port number that the outer terminal 60 wants to assign may be referred to as a "planned port identifier". The message "Data Size=4,372,561 [byte]" indicates that the data size of the data (printing object data) planned to be transmitted to the multi function device 100 by the outer terminal 60 is 4,372,561 bytes. The message "IP Address=ttt.xxx.yyy.zzz" indicates the IP address (a terminal identifier) of the outer terminal 60 that will transmit the printing data. In other words, in the mail (first data), the access request (title of the mail "Port Open Request"), the terminal identifier of the outer terminal 60 (the message "IP Address=ttt.xxx.yyy.zzz"), the process requested for the multi function device 100 (the message "Request=Print"), the planned port identifier (the message "Port Number=515"), and the size of the data (second data) to be transmitted (the message "Data Size=4,372,561 [byte]") are described.

Upon receiving the mail shown in FIG. 3, the multi function device 100 transmits to the router 52 a port-open command that requests the outer network side (WAN 54 side) to open a new port with "515" designated as its port number. It should be noted that the multi function device 100 transmits the port-open-command with a print port number that is assigned to a port of the multi function device 100 itself. The port, assigned by the print port number, opened at the multi function device 100 serves as a port for receiving printing data. In the specification, in order to distinguish a port opened at the multi function device 100 from a port opened at the router 52, a port opened at the multi function device 100 may be referred to as a "device-side port". Moreover, such as the print port number for example, a number (identifier) for the device-side port may be referred to as a "device-side port number (device-side port identifier)". The multi function device 100 opens several device-side ports in accordance with the process thereby executed, as communication ports opened by its own function. That is, when the multi function device 100 receives data that designates a specific device-side port number (such as the print port number), it executes a specific process (such as the printing process) associated with the specific device-side port number. Since the message of the mail from the outer terminal 60 describes an execution request for printing process, the multi function device 100 transmits to the router 52 the port-open-command with the print port number (one of the specific device-side port numbers) along with the planned port number.

Secondly, a process executed by the router 52 to open a new port will be outlined below. The router 52 tries, in response to receiving the port-open-command, to open a new port at the outer network side (WAN 54 side). When the router 52 opens a new port, a port number of the new port and the print port number of the multi function device 100 received with the port-open-command are stored in association with each other. The process of the router 52 of determining a port number of a newly opened port will be described later. After determining a port number, the router 52 stores the port number of the new port in association with the IP address of the multi function device 100. These associations are referred to as port mapping information. When the router 52 receives from the outer terminal the data (second data) that designates the IP address of the router 52 as a destination terminal address as well as designating the port number of the new port, the router 52 transfers the second data to the multi function device 100 based on the port mapping information. That is, the router 52 transfers the second data that had been received through the new port. In the transferring process, the router 52 rewrites the port number in the second data from the port number of the new port to the print port number (the specific device-side-port number). Further, the router 52 rewrites the destination IP address in the second data from the IP address of the router 52 to the IP address of the multi function device 100. These rewriting and transferring are referred to as a so-called port transform process in an NAPT or an IP masquerade. In this way, the router 52 transfers the second data to the multi function device 100 while rewriting the port number from the port number of the new port of the router 52 to the print port number (the specific device-side port number). The data (second data) that initially designated the port number of the new port is rewritten so that it designates the print port number (the specific device-side port number), and then transferred to the multi function device 100 by the router 52. Hence, when the multi function device 100 receives the second data, the print port number (the specific device-side port number) is designated in the second data. The print port number is assigned to the printing process. Therefore, the multi function device prints the second data in response to reception of the second data that had designated the print port number.

Prior to the transmission of the port-open command, the multi function device 100 requests the router 52 the information (the port mapping information) of port numbers that the router 52 has already used. The multi function device 100 can specify a port number (an available port identifier) that is not used by the router 52 by referring to the port mapping information. The multi function device 100 transmits the port-open-command with designation of the planned port number that is included the mail from the outer terminal 60 if the planned port number is not used. On the other hand, if the planned port number is already used, the multi function device 100 transmits the port-open-command with designation of the available port identifier that is determined from the port mapping information. By such a command transmission process, the multi function device 100 can cause the router 52 to open a new port without a duplication of the port number.

The port mapping information (the port mapping information may sometimes be referred to as a "port mapping table") will supplementarily be explained below. The action in which "open a new port" refers to is that a port number desired to be assigned is added to the port mapping information. The action in which "close the port" refers to is that a port number desired to be closed is deleted from the port mapping information. That is, opening (or closing) a port that serves as a logical communication channel is realized by adding (or deleting) a port number to (or from) the port mapping information. In other words, the router 52 always reflects the port number of the port being opened by itself to the port mapping information. The multi function device 100 can request the router 52 to perform the following processes by acquiring the port mapping information from the router 52:

(1) Process of detecting router;
(2) Process of transmitting global address (the IP address set at the outer network side) of the router (Process of transmitting the port mapping information);
(3) Process of opening a new port (Process of adding a port number of new port to the port mapping information); and
(4) Process of closing a port (Process of deleting a port number of the port to be closed from the port mapping information).

In addition, the process relating to the port mapping information can be realized, e.g. by utilizing uPnP (Universal Plug and Play) technology.

An example of the mail transmitted by the multi function device 100 to the outer terminal 60 is shown in FIG. 4. The mail 92 consists of a header 92a and a mail body 92b. In the header 92a, the mail address "pc0@bbb.com" of the outer terminal 60 is described as an address of a mail destination terminal, and the mail address "mfc1@aaa.com" of the multi function device 100 is described as an address of a mail source terminal. In addition, a subject of the mail is "Re: Port Open Request" that represents that this transmission is a reply for the received mail 90. In the mail body 92b, the message "Result=Request Accepted" represents the success of opening the new port. The message "Port Number=50515" notifies the port number of the new port. In this embodiment, the reason why the port number of the new port that the multi function device 100 causes the router to open is "50515" whereas the port number of the new port that the outer terminal 60 wants to newly open (the port number described in the mail 90 (the planned port identifier)) was "515", is because the port number "515" has already been used. The multi function device 100 performed the process which will be described later in detail, and recognized that the planned port number "515" is already used, by means of the aforementioned port mapping information. In this case, the multi function device 100 specifies an unused port number (an available port identifier) and requests the router 52 to open a new port with the specified port number. If the port number "515" is not used, the port number "515" of the desired port by the outer terminal 60 is described in the mail body 92b as a port number of the new port.

In the mail body 92b, the message "IP Address=aaa.bbb.ccc.ddd" notifies the IP address of the router 52 on the outer network side. After receiving the mail 92, the outer terminal 60 can transmit data to the multi function device 100 by designating the IP address of the router 52 as the destination address. That is, by describing the IP address (the IP address of the outer network side) of the router 52 in the mail transmitted to the outer terminal 60 from the multi function device 100, the outer terminal 60 can establish the communication with the multi function device 100 without the IP address of the multi function device 100 being perceived by other terminals (such as the outer terminal 60) connected to the outer network.

Figure 5:
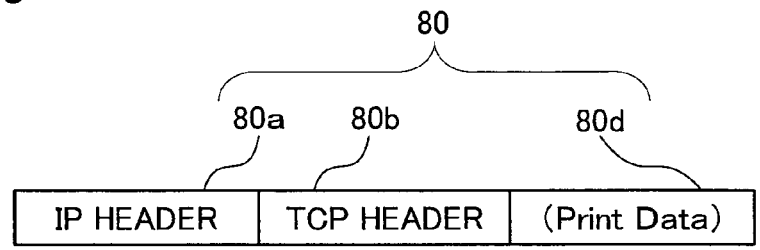
FIG. 5 shows an example of data received by the multi function device from the outer terminal.

Data structure of the second data will be outlined below by referring FIG. 5. The outer terminal 60 that received the mail 92 shown in FIG. 4 from the multi function device 100 can actively access to the multi function device 100 by transmitting the data 80 (the second data) of FIG. 5. The data 80 contains an IP header 80a, a TCP header 80b and a data field 80d. In the IP header 80a, the address "aaa.bbb.ccc.ddd" of the router 52 is described as the destination address, and the IP address "ttt.xxx.yyy.zzz" of the outer terminal 60 is described as the source address. In the TCP header 80b, the port number "50515" of the new port of the router 52 is described as the port number of destination, and the port number of the outer terminal 60 is described as the port number of source. In the data field 80d, the body of data (printing data) to be transmitted to the multi function device 100 is described. The outer terminal 60 can identify the address "aaa.bbb.ccc.ddd" of the router 52 and the port number "50515" of the new port of the router 52 by the mail 92 that had been transmitted from the multi function device 100. It should be noted that the data structures shown in FIG. 3 to FIG. 5 are simplified for the sake of explanation simplicity, and the actual data may have more complicated data structure.

The data 80 received by the router 52 are transferred to the multi function device 100 by the aforementioned port translation processing. In other words, the multi function device 100 can receive the data transmitted actively by the outer terminal 60 through the new port of the router 52.

Since the received data 80 designates the IP address and the port number of the multi function device 100, the multi function device 100 accepts the data. In this way, the multi function device 100 can accept the data 80 transmitted actively by the outer terminal 60. Further, since the data 80 designates the print port number (the specific device-side port number) associated with the printing process, the multi function device 100 can execute the process of printing the received data.

A flow of the process executed by the multi function device 100 will now be described in detail below. Since the process that the multi function device 100 accesses to the POP server 56 at regular intervals in accordance with the mail program 22 is based on the conventional mail protocol, the description thereof is omitted.

Figure 6:
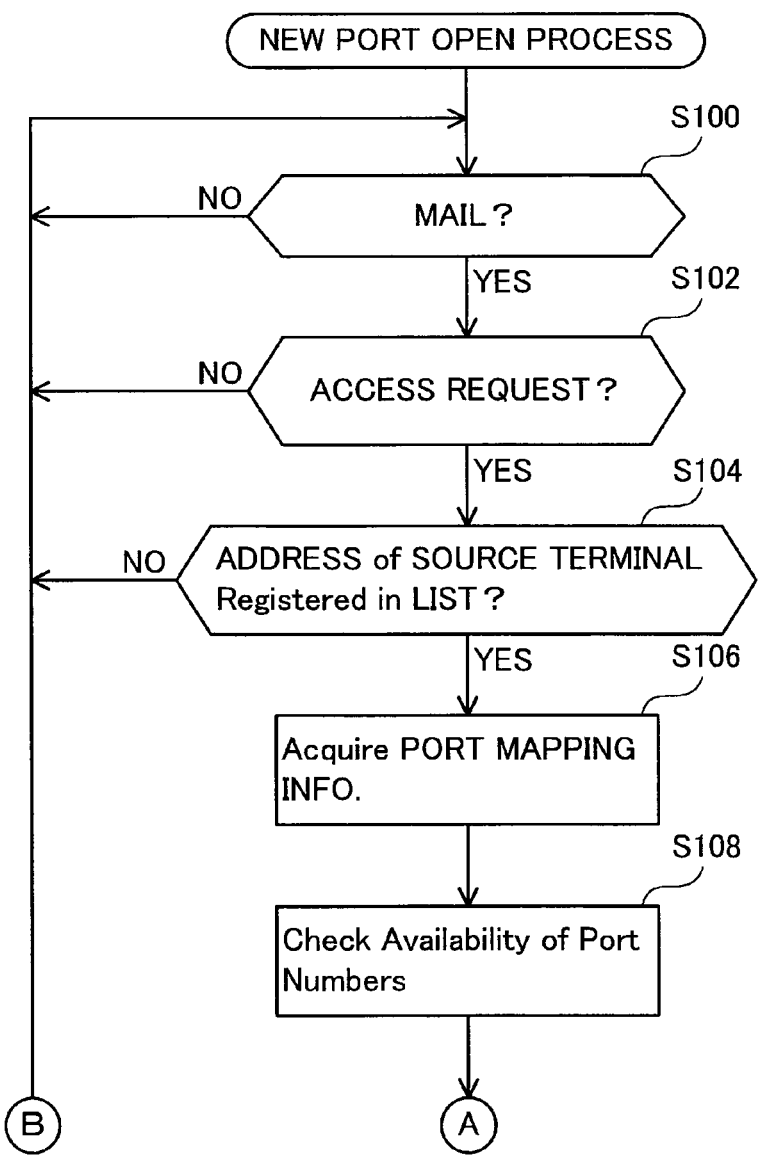
FIG. 6 shows a flow chart of a new communication port open process.
Figure 7:
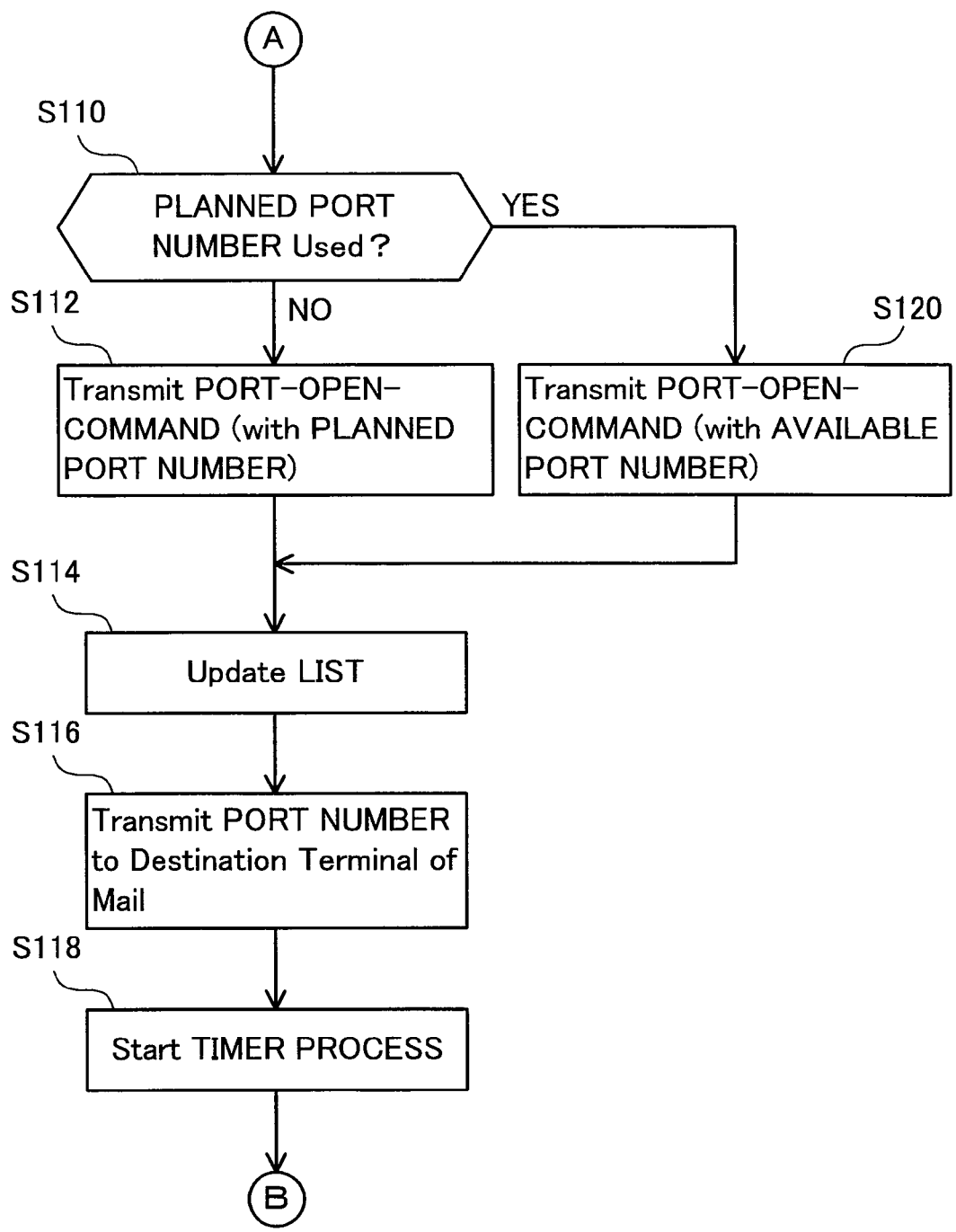
FIG. 7 shows a flow chart of the new communication port open process (continued from FIG. 6).

A flow chart of a new port open process is shown in FIG. 6 and FIG. 7. The instructions to the CPU of the multi function device 100 for the new port open process is described in the port control program 24. It should be noted that the "LIST" shown in the figures means the "address list 26" shown in FIG. 2. The new port open process is activated as one of the tasks at the time of startup of the multi function device 100. In a task process separate from the new port open process, the multi function device 100 accesses to the POP server 56 at regular intervals and acquires the mail addressed to it, in accordance with the mail program 22. The new port open process is executed each time mail is retrieved from the POP server 56. The multi function device 100 determines if there is a mail whose subject is described as "Port Open Request" among the mails acquired from the POP server 56 (Step S100). In this embodiment, the multi function device 100 judges the mail entitled as "Port Open Request" as a request for opening a new port (Step S100: YES). Each of the mails entitled as "Port Open Request" corresponds to the first data. In the following, the case where the mail 90 shown in FIG. 3 was received will be explained.

The multi function device 100 determines if an access request is described in the received mail (first data) (Step S102). The access request is represented by the message "Request=Print" shown in FIG. 3. In a case where the determination of Step S102 is 'YES', the multi function device 100 checks whether the address (terminal identifier) of the source terminal described in the mail is registered in the address list 26 (Step S104). A terminal identifier registered in the address list 26 indicates a second terminal identifier that specifies the terminal (second terminal) for which the multi function device 100 permits an active access. As shown in FIG. 2, "pc0@bbb.com" is described in the section of the mail address of the address list 26. In the received mail 90, "pc0@bbb.com" is described as the address of the mail source terminal. Therefore, in this case, the address of the mail source terminal is registered in the address list 26, so the determination result of Step S104 becomes 'YES'. That is, in this case, the address of the mail source terminal corresponds to the second terminal identifier. In a case where the address of the mail source terminal described in the mail is not registered in the address list 26 (Step S104: NO), the multi function device 100 does not transmit the port-open-command, and then, returns to the waiting state for the reception of another mail (return to Step S100).

In a case where the determination of Step S104 is 'YES', the multi function device 100 acquires the port mapping information from the router 52 (Step S106). Then, the multi function device 100 checks the availability of port numbers by referring to the port mapping information (Step S108). The process of Step S108 is a process of checking whether or not the port number "515" described in the received mail 90 (the message "Port Number=515") is used already by the router 52, and specifying the unused port number (available port identifier) by the router 52.

In a case where the planned port number (the port number "515" described in the mail 90) is not used in the router 52 (Step S110: NO), the multi function device 100 designates the planned port number and transmits the port-open-command to the router 52 including the designation thereof (Step S112). The "planned port number" is the port number specified by the outer terminal 60 (second terminal) through which it requires the active access to the multi function device 100. The planned port number means the port number requested by the outer terminal 60 (second terminal). On the other hand, in a case where the planned port number is used in the router 52 (Step S110: YES), the multi function device 100 determines a suitable unused port number (available port number) by referring to the port mapping information. The multi function device 100 transmits the port-open-command to the router 52 including the designation of the determined available port number (Step S120). In this embodiment, it is assumed that the planned port number "515" is already used, and the port number "50515" is specified as not being used. The multi function device 100 transmits the port-open-command to the router 52 by designating the unused port number (available port number) "50515" at Step S120.

After transmitting the port-open-command to the router 52, the multi function device 100 updates the address list 26 (Step S114). It should be noted that other sections of the record in the address list 26: "IP address", "port number", "data size", and "open time" associated with the mail address "pc0@bbb.com" are not set until the process of Step S114 is executed. In Step S114, the address list 26 is updated as follows. The multi function device 100 registers the IP address "ttt.xxx.yyy.zzz" described in the received mail 90 (i.e. the terminal identifier of the outer terminal 60 that requests an active access) in the section of "IP address" of the address list 26. The multi function device 100 also registers the data size "4,372,561" described in the received mail 90 in the section of "data size" of the address list 26. Further, the multi function device 100 registers the port number of the new port opened by the router 52 in the section of "port number" of the address list 26. The multi function device 100 registers the time previously determined in accordance with the data size in the section of "open time" of the address list 26. For example, the open time is set to 625,000 msec in a case where the data size is not more than 5,000,000 bytes; the open time is set to 1,350,000 msec in a case where the data size is 5,000,000 to 10,000,000 bytes. The open time corresponding to the data size is stored in the memory 20. In this way, respective sections of records including the mail address "pc0@bbb.com" are set.

Then, the multi function device 100 transmits to the outer terminal 60 (second terminal) the mail that describes the port number of the new port that has been opened by the router 52 and the IP address of the router 52 (Step S116). While transmitting the mail, the multi function device 100 sets the address "pc0@bbb.com" as the address of the mail destination terminal. The address of the outer terminal 60 "pc0@bbb.com" is described in the mail 90 that had been acquired at Step S100. Finally, the multi function device 100 starts the timer process (Step S118) and returns to a state of waiting for another mail (return to Step S100).

Figure 8:
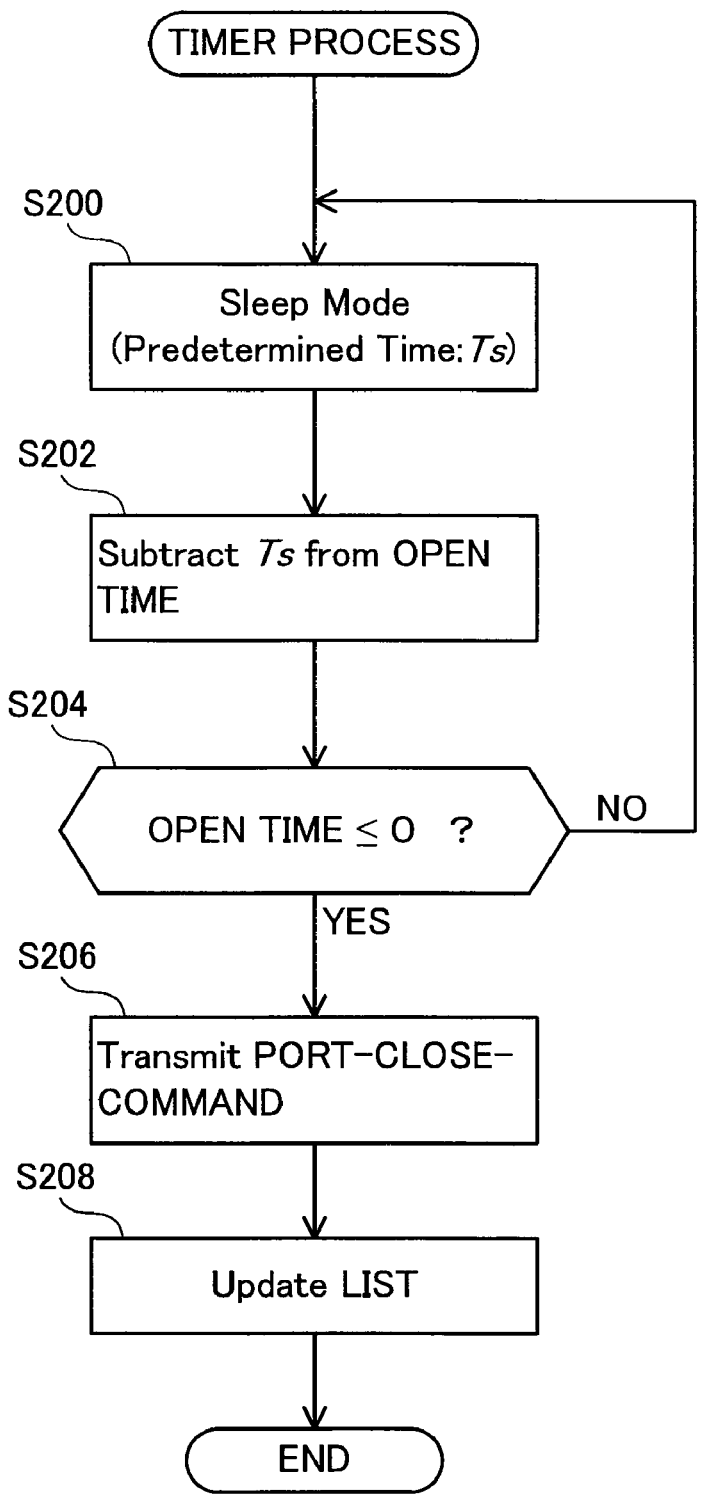
FIG. 8 shows a flow chart of a timer process.

The timer process started in Step S118 will be explained below. A flow chart of the timer process is shown in FIG. 8. This timer process is also described in the port control program 24. This timer process operates as an independent task for each of the new ports opened. The timer process is firstly shifted to a sleep mode for a predetermined time Ts [msec] (Step S200). The "sleep mode" means that no process is executed during the predetermined time Ts. If the predetermined time Ts has elapsed in the sleep mode, the process shifts to a next step S202. In step S202, the multi function device 100 reads the open time registered in the address list 26 and subtracts the given time Ts from the open time. It should be noted that the predetermined time Ts is set to be a relatively short period of duration with respect to the open time that is registered in the address list 26. Then, the sleep mode process is repeated until the subtraction result becomes zero or less (Step S204: NO). That is, steps S200, S202 and S204 are the processes that the timer task waits during the open time registered in the address list 26. If the open time registered in the address list 26 has elapsed, the process shifts to Step S206 (Step S204: YES). At step S206, the multi function device 100 transmits to the router 52 a port-close-command that requests the router 52 for closing the new port that had been previously opened in response to the process of step S112 or step S120. Finally, the multi function device 100 deletes the record including the mail address "pc0@bbb.com" from the address list 26 (Step S208). In other words, the multi function device 100 updates the address list 26 at Step S208. It may also be said that, this timer process is a process of transmitting the port-close-command to the router 52 in a case where the elapsed time from the transmitting timing of the port number (port identifier) (Step S16) exceeds the predetermined open time (threshold value).

Figure 9:
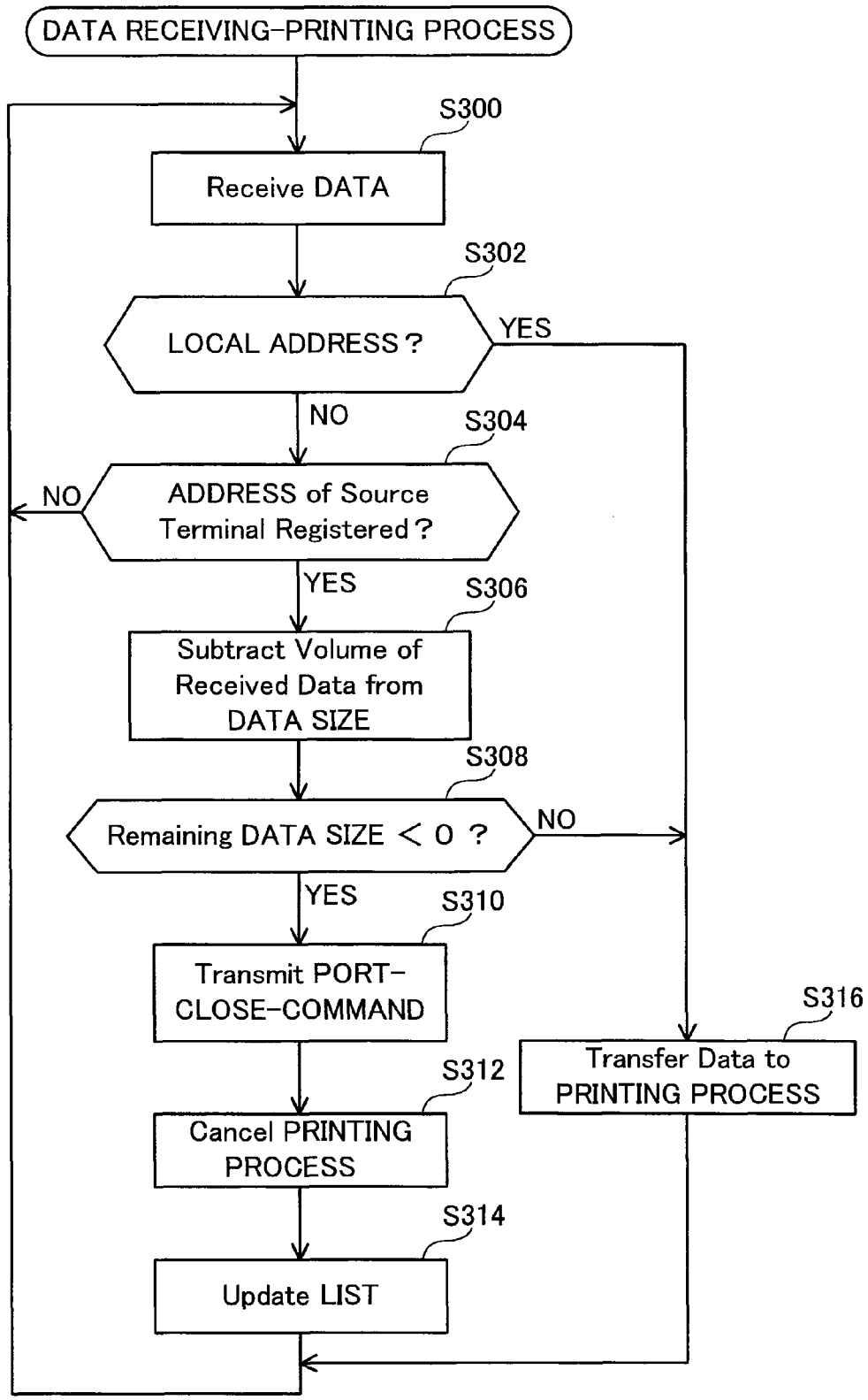
FIG. 9 shows a flow chart of a data receiving-printing process.

Finally, a flow chart of data receiving-printing process shown in FIG. 9 will be described. The data receiving-printing process is activated as one of the tasks at the time of startup of the multi function device 100. The multi function device 100 previously assigns specific processes to the respective port number of the port opened by itself. For example, the printing process is assigned to the print port number "515" (one of the specific device-side port numbers). In other words, in a case where the data that designates (includes) the print port number "515" is received, the multi function device 100 prints the received data. In this embodiment, since the specific process requested by the mail 90 (the specific process that is requested by the outer terminal 60 (the second terminal)) is the printing process, the multi function device 100 transmits to the router 52 the port-open-command with the print port number "515" (the specific device-side port number) assigned to the printing process, in step S112 or S120. When the router 52 receives from the outer terminal 60 data (printing data) that designates the port number "50515" of the new port, the router 52 transfers to the multi function device 100 the received printing data while rewriting the port number "50515" with the print port number "515" based on the port mapping information. When the multi function device 100 receives from the router 52 the printing data (second data) that designates the print port number "515" (the specific device-side port number), the multi function device 100 prints the received second data. The multi function device 100 may receive the data (printing data) that designates the print port number "515" also from the terminals connected to the LAN 50. It is noted that the above example of the port number "50515" is referred from FIG. 4.

When the multi function device 100 receives the printing data (Step S300), it checks whether or not the IP address of the data source terminal is a local address (IP address representing the terminal connected to the LAN 50) (Step S302). In a case where the IP address of the source terminal is the local address (Step S302: YES), the multi function device 100 transfers the received printing data to the printing process (Step S316). In addition, the printing process is the same as the process of a conventional printer, so the description thereof is omitted. In a case where the IP address of the source terminal of the printing data is not the local address (Step S302: NO), the printing data is determined to have been transmitted from the outer terminal connected to the outer network through the router 52. In this case, the multi function device 100 checks whether or not the IP address of the source terminal is registered in the address list 26 (Step S304). That is, the multi function device 100 checks whether or not the source terminal of the printing data is the terminal identified by the second terminal identifier. In a case where the IP address of the source terminal is not registered in the address list 26 (Step S304: NO), the multi function device 100 discards the received data and waits for the reception of new data (return to Step S300). By the process of step S304, the multi function device 100 accepts data transmitted only from the terminal that is permitted an access from the outer network (that is, the second terminal identified by the second terminal identifier). In other words, by the process of step S304, the multi function device 100 denies an access from the outer terminal that has not been permitted of an access.

In a case where the IP address of the source terminal is registered in the address list 26 (Step S304: YES), data amount of the received data is subtracted from the data size registered in the address list 26 (Step S306). The outer terminal 60 may divide the printing data into small fractions (packets) and transmit them sequentially. Therefore, each time one packet is received, the multi function device 100 subtracts volume of the received data from the data size registered in the address list 26, and thereby the multi function device 100 can know the planned data size of the remaining printing data. In a case where the data size of the subtraction result is zero or more (that is, in a case where volume of the received data is less than the data size initially registered in the address list 26), the received data are transferred to the printing process (Step S308: NO, Step S316). In the cases where the printing data is received sequentially in packets, each packet of print data is processed through steps 300 to 308; that is, each of the print data is sent to the printing process orderly as they are received.

On the other hand, in a case where the data size of the subtraction result is less than zero (Step S308: YES), the multi function device 100 transmits to the router 52 a port-close-command for closing the new port (Step S310). The case in which "the data size of the subtraction result is less than zero" means that the data having a size exceeding the data size (4,372,561 [byte]) that had been planned to be transmitted as is described in the mail 90 is received. In such a case where the data having a size more than the planned size are received, the multi function device 100 determines that some kind of anomalies have occurred, and cancels the printing process (Step S312). If the process of step S312 is executed, the received data that were transferred so far to the printing process in step S316 are discarded and the printing process is cancelled. Finally, the multi function device 100 deletes the record including the mail address "pc0@bbb.com" from the address list 26 (Step S314), and again returns to a wait for another printing data (return to step S300).

In the process of the multi function device 100 described above, the control module 12 at a time when executing the process of receiving the mail 90 (the first data) from the POP server 56 (the first terminal) and executing the process of step S100 may be stated in another way as "the access control module". The access control module may access through the router 52 to the POP server 56 (the first outer terminal) connected to the outer network, and acquire the mail 90 (the first data transmitted by the outer terminal 60 that requests an active access) stored in the POP server 56. Further, the control module 12 at a time when executing instructions of the port control program 24 (specifically, the processes of step S102 to S112 and the process of step S120) may be stated in another way as "the port control module". The port control module may transmit a port-open-command that requests the router 52 to open a new port in a case where the acquired mail (the first data) contains a terminal identifier of the outer terminal 60 (the second terminal) and an access request from the outer terminal 60. Furthermore, the control module 12 at a time when executing the process of step S116 may be stated in another way as "the port data transmitting module". The port data transmitting module may transmit the port identifier of the new port to the outer terminal 60 (the second terminal) specified by the terminal identifier. The process executed by the control module 12 as the port control module may include the timer process shown in FIG. 8 or the data receiving-printing process shown in FIG. 9.

The multi function device 100 (the information processing device) of the present teachings has the following technical features:

(1) The multi function device 100 may access to the POP server 56 (the first terminal connected to the outer network) at regular intervals and acquire a mail addressed to it.

(2) The multi function device 100 may transmit a port-open-command to the router 52 in response to the access request described in the mail from the outer terminal (the second terminal). By such features (1) and (2), the multi function device 100 may cause the router 52 to open a new communication port that permits an active access by the outer terminal, in response to the access request from the outer terminal. That is, the multi function device 100 may permit an active access from the outer terminal at adequate timing in regards to when the user of the outer terminal requires to do so (triggered by the reception of the mail transmitted by the outer terminal). The active access from the outer terminal is suitable for a large-size data communication, in contrast to a passive access such as a mail protocol. Further, the user can actively access to the multi function device 100 from the outer terminal, without directly operating the multi function device 100.

(3) The multi function device 100 may transmit the port-open command to the router 52 under a first condition that the identifier (the second terminal identifier that identifies the second terminal, i.e. the mail address "pc0@bbb.com" of the mail source terminal) of the source terminal described in the mail is previously registered in the address list 26. Further, the multi function device 100 may accept the second data transmitted through a new communication port under a second condition that the terminal identifier of source terminal that transmits the second data through the new port of the router 52 (the source terminal identifier, "ttt.xxx.yyy.zzz" in the embodiment) is registered in the address list 26. By such feature (3), the multi function device 100 may doubly check the terminal identifier (the mail address and the IP address of the terminal) of the outer terminal, thereby ensuring high-security.

(4) The multi function device 100 may execute the process (the printing process in the embodiment) described in the mail to the second data received from the outer terminal. The multi function device 100 may designate the process to handle the second data prior to the active access of the outer terminal. By this feature, the multi function device may avoid executing undesired process to the second data received through the new port. For example, in a case where the process described in the mail is the printing process, even if the data actively transmitted by the outer terminal contains a virus, the activity of the virus can be prevented.

A preferred modification of the above described embodiment will be described below. For example, the multi function device 100 may employ, as the terminal identifier of the outer terminal 60, both the mail address and IP address of the outer terminal 60. However, it may employ only the IP address. Specifically, in a process of step S104 in the embodiment, the multi function device 100 collates the mail address of the mail source terminal and the mail address registered in the address list 26. Instead of this process, the IP address of the outer terminal 60 may be previously registered in the address list 26. In this case, in a process of step S104, the multi function device 100 has only to check whether or not the IP address, of the outer terminal, as described in the mail 90 (the message "IP Address=ttt.xxx.yyy.zzz") is registered in the address list 26. In both step S104 and step S304, the IP address of the outer terminal 60 that requests an active access can be checked.

In addition, in the above-described embodiment, the outer terminal 60 (second terminal) requests the multi function device 100 the execution of the printing process by describing the message "Request=Print" in the mail 90. The outer terminal 60 can request the execution of other processes by using the mail. For example, if the mail describes the message "Request=Data Request", the outer terminal 60 requests the multi function device 100 to receive the transmitted data. Further, though the multi function device 100 is constituted so as to acquire the mail from the POP server 56 as the first data in the above-described embodiment, the first data is not limited to the electronic mail. The multi function device 100 accesses to a specific server at regular intervals, and may acquire data of other formats as the first data. Regardless of the data type, the first data merely needs to have the message that requests to open a new port be described therein. Further, in a case where no data is received through the new port from the outer terminal 60 (the second terminal) until the elapsed time after the transmission of the port identifier exceeds the threshold, the port control program 24 (the port control module) may transmit to the router 52 the port-close-command for closing the new port. Such a technical feature causes the router to close the new port even if the opened new port was not utilized for some reason.

Some of the other technical features of the multi function device 100 (the embodiment of the information processing device) are listed below.

(1) The port control module may transmit the port-open command to the router 52 under a first condition that the terminal identifier described in the acquired first data is registered in the identifier list 26 previously stored in the multi function device 100. Such a technical feature may cause the router 52 to open a new port with respect to only the outer terminal 60 that has been specified by the terminal identifier registered in the list 26. Such a technical feature improves the security of LAN. In a case where the first terminal is a POP server and the protocol by which the multi function device 100 accesses to the first terminal is a mail protocol, "the terminal identifier described in the acquired data" may be an address of a mail source terminal appended to the mail.

(2) The port control module may accept the data (second data) transmitted through the new port under a second condition that the source terminal identifier that identifies a source terminal of the data (second data) transmitted through the new port is registered in the identifier list that is previously stored in the multi function device 100. The multi function device 100 having such a technical feature accepts data only from the outer terminal specified by the terminal identifier that is previously registered in the identifier list 26.

(3) The port control module is more desirable to have the above described two technical features (1) and (2) simultaneously. Such an information processing device may check that an outer terminal that requested an access coincides with an outer terminal registered in the list when the new port is opened and when the data transmitted through the new port is received. That is, such an information processing device ensures high-security against an access request from the outer terminal.

(4) Preferably, the data acquired from the first terminal contains a data size. The term "data size" here restricts a size of the data that should be transmitted from the second terminal to the information processing device. Further, the port control module preferably transmits to the router the port-close-command under a third condition that an amount of data received through the new port reaches the data size contained in the first data. Such technical features can cause the router to close the new port at the time of receiving the predetermined amount of data. In a case where the second data are split into several units (i.e. packets) and transmitted, the port control module may transmit a port-close-command when an accumulated amount of the received data reaches the "data size".

(5) The port control module preferably transmits the port-close-command under a fourth condition that a time that had elapsed from a timing of transmitting the port identifier exceeds a threshold. Such a technical feature prevents the new port from remaining the opened state in a case where the opened new port was not utilized for some reason or in a case where the communication with the second terminal is stopped before transmitting whole data for some reason.

(6) In the first data acquired by the access module, a planned port identifier may be described. In this case, the port control module is desirable to transmit to the router an open-command that opens a new port with of the planned port identifier described in the acquired first data. Such a technical feature can previously specify the port identifier used for data communication. In this case, it is beneficial for the information processing device to previously store the terminal identifier of the second terminal and the planned port identifier in association with each other. Further, the port control module preferably transmits a port-close-command to the router under a fifth condition that the terminal identifier and the planned port identifier described in the acquired first data coincide with the terminal identifier and the planned port identifier stored previously. The terminal identifier and the planned port identifier function as a so-called password, and therefore security for an access from the outer network to the LAN can be increased.

In a case where the first data describe the planned port identifier, the port control module may preferably have a function of determining whether or not the router can open a new port with the planned port identifier. In this case, in a case where it is determined that a new port cannot be opened with the planned port identifier, it is desirable to transmit to the router a port-open-command that requests the router to specify a port identifier (an available port identifier) that is capable of allocating to a new port and to open the new port with the specified available port identifier. Since, in many cases, the router opens several ports in advance, such a technical feature can avoid duplication of the port identifiers.

The specific examples of the present invention are described above, but these merely illustrate some possibilities of the invention and do not restrict the claims thereof. The art set forth in the claims includes transformations and modifications to the specific examples set forth above. The technical elements disclosed in the specification or the drawings may be utilized separately or in all types of combinations, and are not limited to the combinations set forth in the claims at the time of filing of the application. Furthermore, the art disclosed herein may be utilized to simultaneously realize a plurality of aims or to realize one of these aims.

What is claimed is:

1. An information processing device being capable of connecting to a local area network that is connected to an outer network through a router, the information processing device comprising:
   one or more processors; and
   a memory that stores an identifier list and a computer program including instructions executed by the one or more processors, wherein the instructions, when executed by the one or more processors, cause the one or more processors to function as:
      an access control module that accesses through the router a first terminal connected to the outer network and acquires first data stored in the first terminal;
      a port control module that transmits to the router a port-open-command that requests the router to open a new communication port in a case where the acquired first data contains a second terminal identifier that identifies a second terminal connected to the outer network and an access request from the second terminal under a first condition that the second terminal identifier contained in the acquired first data is registered in the identifier list stored in the memory, wherein the port control module does not transmit the port-open-command in the case where the acquired first data contains the second terminal identifier and the access request from the second terminal under a condition that the second terminal identifier contained in the acquired first data is not registered in the identifier list, and the port control module does not transmit the port-open-command in a case where the acquired first data does not contain the second terminal identifier and the access request from the second terminal; and
      a port data transmitting module that transmits to the second terminal a port identifier of the new communication port.

2. The information processing device of claim 1, wherein the port data transmitting module transmits a router identifier to the second terminal along with the port identifier.

3. The information processing device of claim 1, wherein the port control module accepts second data transmitted through the new communication port under a second condition that a source terminal identifier that identifies a source terminal that transmits the second data is registered in the identifier list stored in the memory.

4. The information processing device of claim 1, wherein:
   the acquired first data contains a data size; and
   the port control module transmits to the router a port-close-command that requests the router to close the new communication port under a third condition that an amount of data received from the second terminal reaches the data size.

5. The information processing device of claim 1, wherein the port control module transmits to the router a port-close-command that requests the router to close the new communication port under a third condition that a time that had elapsed from a timing of transmitting the port identifier exceeds a threshold.

6. The information processing device of claim 1, wherein:
   the one or more processors is configured to execute a process corresponding to a device-side-port identifier when the information processing device receives data that includes the device-side port identifier;
   the acquired first data contains a specific process identifier for specifying a specific process that the second terminal requires the one or more processor to execute; and
   the port control module transmits to the router along with the port-open-command a specific device-side port identifier that corresponds to the specific process specified by the specific process identifier.

7. The information processing device of claim 1, wherein:
   the acquired first data contains a planned port identifier; and
   the port control module transmits to the router the port-open-command that requests the router to open the new communication port with the planned port identifier.

8. The information processing device of claim 7, wherein the port control module specifies an available port identifier by which the new communication port can be identified and transmits to the router the port-open-command that requests the router to open the new communication port with the available port identifier in a case where the router has not been able to open the new communication port with the planned port identifier.

9. The information processing device of claim 8 wherein:
   the port control module acquires from the router through the local area network port mapping information that describes already used port identifiers, and
   the port control module judges that the router has not been able to open the new communication port with the planned port identifier when the planned port identifier is described in the port mapping information.

10. A computer implemented method for an information processing device being capable of connecting to a local area network that is connected to an outer network through a router, the method includes steps of:
    accessing through the router, by the information processing device, a first terminal connected to the outer network at regular intervals;
    acquiring first data stored in the first terminal;
    transmitting to the router, by the information processing device, a port-open-command that requests the router to open a new communication port in a case where the acquired first data contains a second terminal identifier that identifies a second terminal connected to the outer network and an access request from the second terminal under a first condition that the second terminal identifier contained in the acquired first data is registered in an identifier list stored in the information processing device, wherein the port control module does not transmit the port-open-command in the case where the acquired first data contains the second terminal identifier and the access request from the second terminal under a condition that the second terminal identifier contained in the acquired first data is not registered in the identifier list, and the port control module does not transmit the port-open-command in a case where the acquired first data does not contain the second terminal identifier and the access request from the second terminal; and transmitting, by the information processing device, a port identifier of the new communication port to the second terminal.

11. The computer implemented method of claim 10, wherein the acquired first data contains a data size, and the method further includes the step of:

transmitting to the router, by the information processing device, a port-close-command that requests the router to close the new communication port under a third condition that an amount of data received from the second terminal reaches the data size.

12. A non-transitory computer readable medium having a computer program including instructions stored thereon that, when executed by one or more processors of an information processing device that is capable of connecting to a local area network connected to an outer network through a router, cause the one or more processors to perform steps of:

accessing through the router a first terminal connected to the outer network at regular intervals;

acquiring first data stored in the first terminal;

transmitting to the router a port-open-command that requests the router to open a new communication port in a case where the acquired first data contains a second terminal identifier that identifies a second terminal connected to the outer network and an access request from the second terminal under a first condition that the second terminal identifier contained in the acquired first data is registered in an identifier list stored in the information processing device, wherein the port control module does not transmit the port-open-command in the case where the acquired first data contains the second terminal identifier and the access request from the second terminal under a condition that the second terminal identifier contained in the acquired first data is not registered in the identifier list, and the port control module does not transmit the port-open-command in a case where the acquired first data does not contain the second terminal identifier and the access request from the second terminal; and transmitting a port identifier of the new communication port to the second terminal.

13. The non-transitory computer readable medium of claim 12, wherein the acquired first data contains a data size, and wherein the computer program, when executed by the one or more processors, further performs the step of:

transmitting to the router a port-close-command that requests the router to close the new communication port under a third condition that an amount of data received from the second terminal reaches the data size.

* * * * *